Patented Jan. 17, 1950

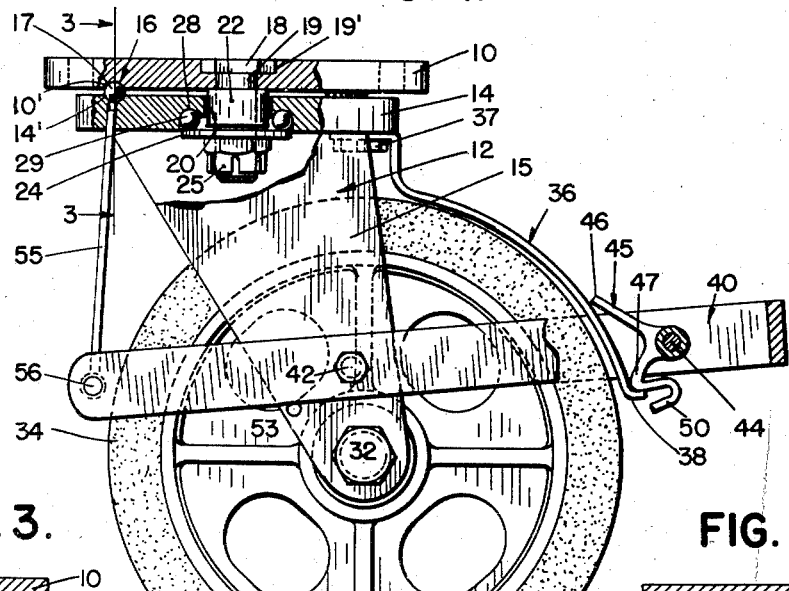
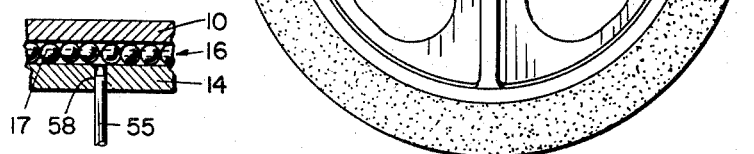
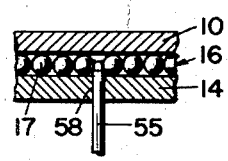
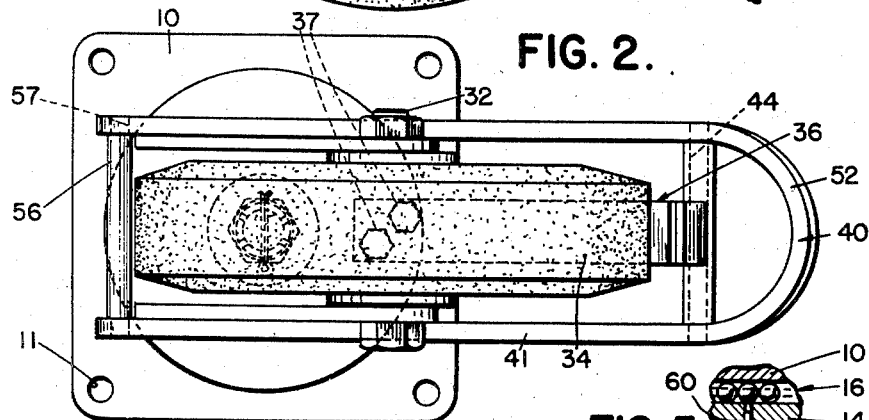
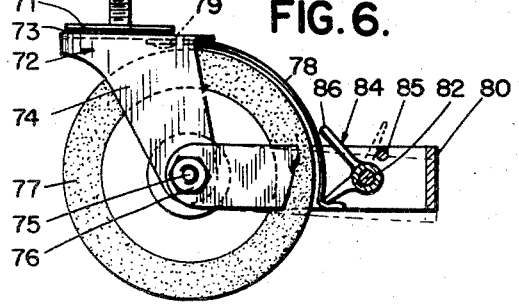
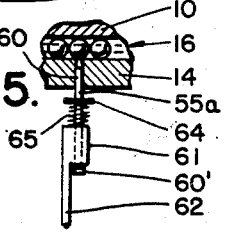

2,494,696

UNITED STATES PATENT OFFICE 2,494,696

CASTER BRAKE

Charles F. Forbes, Los Angeles, Calif.

Application July 15, 1946, Serial No. 683,673

6 Claims. (Cl. 16—35)

This invention relates generally to truck casters and particularly to means for locking a caster wheel against rotation about its horizontal axis and against swiveling about its vertical axis of rotation.

It is common to use what are termed platform trucks including a flat body supported by four casters, of which at least two are usually of the swivel type, in the movement of freight and heavy objects generally. Large sized casters are also used in hospitals and the like for beds and patient transporting tables. From the standpoint of safety and convenience, it is desirable to be able to lock one or more of the casters on such vehicles against rotation and against swiveling.

I am aware that various caster brakes and anti-swivel locking devices have been employed, but these usually operate independently of each other and have not proven entirely satisfactory. As evidence of this, one of the most commonly used types of lock or brake for a platform truck is a device mounted beneath the truck body independently of the casters for engagement with the floor.

It is a primary object of this invention to provide a novel caster construction embodying means for locking the caster roller or wheel against rotation and for simultaneously locking the caster against swiveling.

It is also an object of the invention to provide a simple form of caster brake designed to merely lock the caster roller against rotation.

It is also an object to provide caster braking mechanism which can be operated readily by the foot.

It is also an object of the invention to provide a novel means for locking two relatively rotatable parts against rotation.

These and other objects will be apparent from the drawing and the following description. Referring to the drawing, which is for illustrative purposes only:

Fig. 1 is a side elevation broken away to show parts in section of a swivel type caster embodying the invention;

Fig. 2 is an inverted plan view of the device of Fig. 1;

Fig. 3 is a fragmentary sectional view on line 3—3 of Fig. 1, showing the swivel locking means in inoperative position;

Fig. 4 is a view similar to Fig. 3 but showing the parts in locking or operative position;

Fig. 5 is a fragmentary view of a modified form of pin; and

Fig. 6 is an elevational view of a caster embodying the roller brake of the invention.

More particularly describing the invention, reference numeral 10 generally indicates the top plate or mounting plate of a caster which is provided with four holes 11 so that the same may be secured to the under part of a truck frame or the like. Mounted beneath the top plate is a horn generally indicated by numeral 12 comprising the plate portion 14 and the depending legs 15. The top plate 10 and the plate portion 14 of the horn are provided with circular grooves 10' and 14' which cooperate to form a raceway, generally indicated by 16, for the bearing balls 17. The top plate and horn are joined by a king pin 18 fitted in a suitable bore and counterbore generally indicated at 19, 19' in the top plate and extending through an opening 20 in the plate portion 14 of the horn.

A sleeve 22 is carried on the pin. The pin is also provided with a bearing washer 24 and a nut 25 for retaining the parts in position. A counterbore 26 is provided in the lower part of the plate portion 14 of the horn and this is provided with a circular groove 28 to accommodate the bearing balls 29 located between the plate portion 14 and the bearing washer 24.

Rotatably mounted between the legs 15 of the horn on a suitable axle 32 is a conventional caster roller or wheel 34. Means are provided, as indicated before, for locking the wheel against rotation about its horizontal axis, that is, the axle 32. This means includes a brake band generally indicated by numeral 36 which is a flat band of generally arcuate shape to conform to the curve of the roller and preferably is made of metal having spring quality. The upper end of the brake band is secured to the horn by suitable bolts 37. The lower end of the band is free and has a short outwardly extending projection 38 for a purpose which will later become apparent.

The band is normally in the position in which it is shown in Fig. 1, that is, spaced from the wheel in inoperative or non-braking position. Means are provided for actuating the brake band to cause it to engage the roller and, in the form of the invention shown, this means comprises a lever in the form of a yoke 40 which is generally U-shaped and provided with a pair of legs 41 pivotally mounted on the legs 15 of the horn by suitable bolts 42. In this connection it is pointed out that though yoke 40 is shown mounted above the axle 32, it is contemplated that the same might be mounted for pivotal movement about the axis of the roller.

The yoke supports a cross pin 44 which carries an actuating lever 45 shaped like a bell crank having two arms 46 and 47. The lever is freely rotatable on the pin 44. In Fig. 1, the arm 47 of the lever has a U-shaped extension or stop element 50 which is adapted to engage the projection at the lower end of the brake band when the band is in braking position.

In the operation of the brake for the roller, it is only necessary to step on the closed end 52 of the yoke in order to force it down and cause the lever 45 to rotate on its axis and actuate the brake band 36 into frictional engagement with the roller. Due to the relative length of the leg 47 and the angle of the brake band in the region where it is engaged by the lever 45, the mechanism tends to remain locked in braking position. In order to release the brake, it is only necessary to kick or lift the yoke end 52 to return the parts to the position in which they are shown in Fig. 1. In this connection it may be pointed out that a stop pin 53 is provided limiting movement of the parts.

As a part of the invention means are provided for locking the swivel action of the caster simultaneously with the locking of the wheel against rotation. The means for accomplishing this might be used in a variety of installations embodying two relatively rotatable elements with a ball or roller bearing therebetween. This means includes a pin 55 which is mounted on a rod 56, the ends of which are rotatably received in the ends of the yoke in bore 57 therein. The upper end of the pin 55 is received in a bore 58 which intersects the groove 14' of the upper raceway in a region where, due to the offset roller, the bearings are not loaded.

When the brake is in inoperative position, as shown in Figs. 1 and 3, the pin 55 extends just short of the raceway and does not interfere with the movement of the ball bearings 17 therein. However, when the end 52 of the yoke is depressed to actuate the brake, the pin 55 is forced upwardly into the raceway between the bearings therein, as indicated in Fig. 4, preventing their movement in the raceway. In this connection it is pointed out that the total space between the engaging peripheral portions of the bearings should be only very slightly in excess of the distance of the diameter of the pin 55 in order that the pin may substantially take up the entire play between the bearings and thereby lock them against movement. Since the bearings are locked against movement in the region of the pin, the loaded bearings on the opposite side of the raceway are positively prevented from moving and the parts are thus locked against rotation or swiveling.

It is to be understood that, as previously pointed out, in the construction shown the pin 55 enters the raceway in a region where the bearings are not loaded, the bearings on the right side only of the upper raceway being loaded. If desired, means can be provided for preventing movement of the bearings 29 in the lower raceway at the opposite side where they are not loaded and thereby lock the parts against movement. The invention is also applicable to roller bearings as well as ball bearings.

Preferably when the brake is in the locked position the pin 55 only enters the bearing race a little over halfway of the race and the projection or stop 50 on the lever 45 serves as a guard against the pin being forced entirely through the raceway to scar or mar the groove 10' forming the upper boundary of the raceway. From the construction above outlined it is apparent that by depressing the end 52 of the yoke the lever 45 is effective to force the brake band 36 into frictional engagement with the roller 34 and simultaneously to force the pin 55 into the raceway in order to lock the bearings therein against movement, thereby locking the caster against swivel action.

Where it is desired to lock two relatively rotatable members against movement in either direction, as the mounting plate 10 and the horn 14 of the caster illustrated, it is preferable to have the pin or other element which enters the raceway take up a space equal to the total play or space between the bearings in the raceway. However, it is contemplated that in some instances it may only be necessary to lock the parts against relative rotation in one direction and where this is the case a pin or other means may be inserted in the raceway and although the pin or means does not occupy a space equal to the total play space in the raceway between the bearings, the pin or means will nevertheless obstruct or prevent movement of the bearings in one direction and thereby serve to lock the parts against relative rotation in that direction although permitting a slight degree of movement of the bearings and the parts in the opposite direction.

In some cases it may be desirable to provide a resilient means for entering the raceway to prevent jamming of the device in the event such means cannot readily enter the raceway between the bearings when it is actuated. Therefore, in Fig. 5, a resilient pin 55a is shown. This pin includes a short pin 60 slidably mounted in a bracket 61 at the end of a long pin 62 which may be considered as extending down to the cross pin 56 previously described. The short pin has a head 60' and a cross stop 64. A compression spring is positioned between the stop 64 and the bracket 61.

With this construction, if the pin 60 does not readily enter the raceway, the spring 65 is compressed and as soon as the bearings have moved slightly is effective to force the pin 60 in between two adjacent bearings to lock the parts as previously described.

In Fig. 6 there is shown a simplified form of the invention embodying merely the means for braking the caster wheel. In the device illustrated a caster stem and top plate indicated at 70 and 71 carry a horn 72 with conventional ball bearings 73 therebetween. The legs 75 of the horn support an axle in the form of a bolt 75 and retaining nut 76 for rotatably supporting a caster roller 77. In this form of the invention the brake band indicated by numeral 78 is riveted at its upper end at 79 to the horn and the lower end is free. A yoke 80 is provided which is mounted about the axle 75 and carries a cross pin 82 for supporting the actuating lever 84. This lever is of generally the same shape as that heretofore described and indicated by numeral 45 except that it does not have a stop portion at its lower end.

In order to limit the movement of the yoke 80 a stop pin 85 is provided in the yoke against which the upper arm 86 of the actuating lever abuts when the device is in braking position. As in the form of the invention previously described, it is only necessary to depress the yoke 80 in order to actuate the brake mechanism into operative braking position.

It is contemplated that various changes and modifications can be made without departing from the invention and it is intended to cover such variations as come within the scope of the claims.

I claim:

1. In means for locking relatively rotatable elements against rotation, a pair of elements mounted for rotation relative to each other, said elements having opposing faces forming a bearing raceway, a plurality of movable bearings in said raceway, and means adapted to enter said raceway between bearings to prevent movement of said bearings whereby said elements are prevented from rotating relative to each other.

2. In means for locking relatively rotatable elements against rotation, a pair of elements mounted for rotation relative to each other, said elements having opposing faces forming a bearing raceway, a plurality of bearings in said raceway, one of said elements being eccentrically disposed about the pivotal axis of the elements whereby some of said bearings are loaded and some are not, and means adapted to enter said raceway between two adjacent non-loaded bearings to take up the slack space between said bearings whereby the same are prevented from moving and said elements are prevented from rotating relative to each other.

3. In a caster, a mounting element, a horn mounted to swivel on said element, a roller rotatably mounted in said horn, a bearing means including a plurality of individually movable bearings between said element and said horn, a lever pivotally mounted on said horn and extending to opposite sides thereof, a pin mounted on said lever and adapted to enter between bearings and prevent same from moving, and means for limiting movement of said lever.

4. In a caster, a mounting element, a horn mounted to swivel on said element, a roller rotatably mounted in said horn, a bearing means including a plurality of individually movable bearings between said element and said horn, a lever pivotally mounted on said horn and extending to opposite sides thereof, and a longitudinally resilient pin mounted on one end of said lever and adapted to enter between bearings and prevent same from moving.

5. In a caster, a mounting element, a horn mounted to swivel on said element, said element and said horn having opposing faces forming a bearing raceway, a plurality of individually movable bearings in said raceway, and a pin movably supported on said horn and constructed and arranged to enter said raceway between adjacent bearings therein.

6. In a caster, a mounting element, a horn mounted to swivel on said element, said element and said horn having opposing faces forming a bearing raceway, a plurality of individually movable bearings in said raceway, a caster wheel mounted on said horn with the axis of rotation of said wheel spaced radially of the common pivotal axis of the horn and mounting element whereby in use normally only the bearings on one side of said raceway are loaded, and a pin movably supported on said horn and constructed and arranged to enter said raceway between two adjacent non-loaded bearings to take up the slack space between said bearings and thereby immobilize the bearings.

CHARLES F. FORBES.

REFERENCES CITED

The following references are of record in the file of this patent:

UNITED STATES PATENTS

| Number | Name | Date |
| --- | --- | --- |
| 1,632,435 | Darnell | June 14, 1927 |
| 1,671,774 | McIntosh | May 29, 1928 |
| 1,998,236 | Herold | Apr. 16, 1935 |
| 2,081,594 | McIntosh | May 25, 1937 |
| 2,147,064 | Schultz, Jr. | Feb. 14, 1939 |
| 2,262,433 | Uecker et al. | Nov. 11, 1941 |
| 2,345,442 | Winter et al. | Mar. 28, 1944 |
| 2,366,927 | Noelting et al. | Jan. 9, 1945 |
| 2,422,892 | Forbes et al. | June 24, 1947 |

FOREIGN PATENTS

| Number | Country | Date |
| --- | --- | --- |
| 14,244 | Great Britain | of 1905 |
| 672,197 | Germany | Feb. 9, 1939 |